United States Patent [19]
Wither

[11] Patent Number: 5,272,378
[45] Date of Patent: Dec. 21, 1993

[54] APPARATUS FOR GENERATING POWER

[76] Inventor: Thomas A. Wither, 1204 Grove Ave., Royal Oak, Mich. 48067

[21] Appl. No.: 926,778

[22] Filed: Aug. 6, 1992

[51] Int. Cl.5 ............................................... F03D 3/02
[52] U.S. Cl. ........................................ 290/1 R; 290/55; 290/44; 415/2.1; 415/4.2; 416/DIG. 9
[58] Field of Search ................... 290/1 R, 44, 55; 415/2.1, 4.2; 416/DIG. 9

[56] References Cited

U.S. PATENT DOCUMENTS

| | | | |
|---|---|---|---|
| 1,334,882 | 3/1920 | Boettner | 416/197 A |
| 3,885,163 | 5/1975 | Toberman | 290/1 R |
| 4,002,218 | 1/1977 | Horvat | 290/44 |
| 4,204,795 | 5/1980 | Forrest | 416/197 A |
| 5,137,416 | 8/1992 | Mohrman | 415/2.1 |

OTHER PUBLICATIONS

BHRA and Netherlands Energy Research Foundation, Wind Energy Systems, Oct. 1978, pp. (F3-30)-(F3-34).
Park, The Wind Power Book, 1981, pp. 66-67, 74-75, 79, 93-95.

Primary Examiner—Howard L. Williams
Assistant Examiner—Robert Lloyd Hoover
Attorney, Agent, or Firm—Harness, Dickey & Pierce

[57] ABSTRACT

An apparatus for generating power by utilizing the wind produced from the passage of vehicular traffic such as on a highway or freeway includes a plurality of vertical axis rotors mounted vertically within a support structure. Each of the vertical axis rotors is coupled to a generator adapted to convert rotational energy of the rotors into electrical energy. The apparatus is particularly well adapted for placement between two opposing lanes of vehicular traffic in order to provide a barrier which replaces conventional barriers with one adapted to harness a previously unused source of energy.

16 Claims, 2 Drawing Sheets

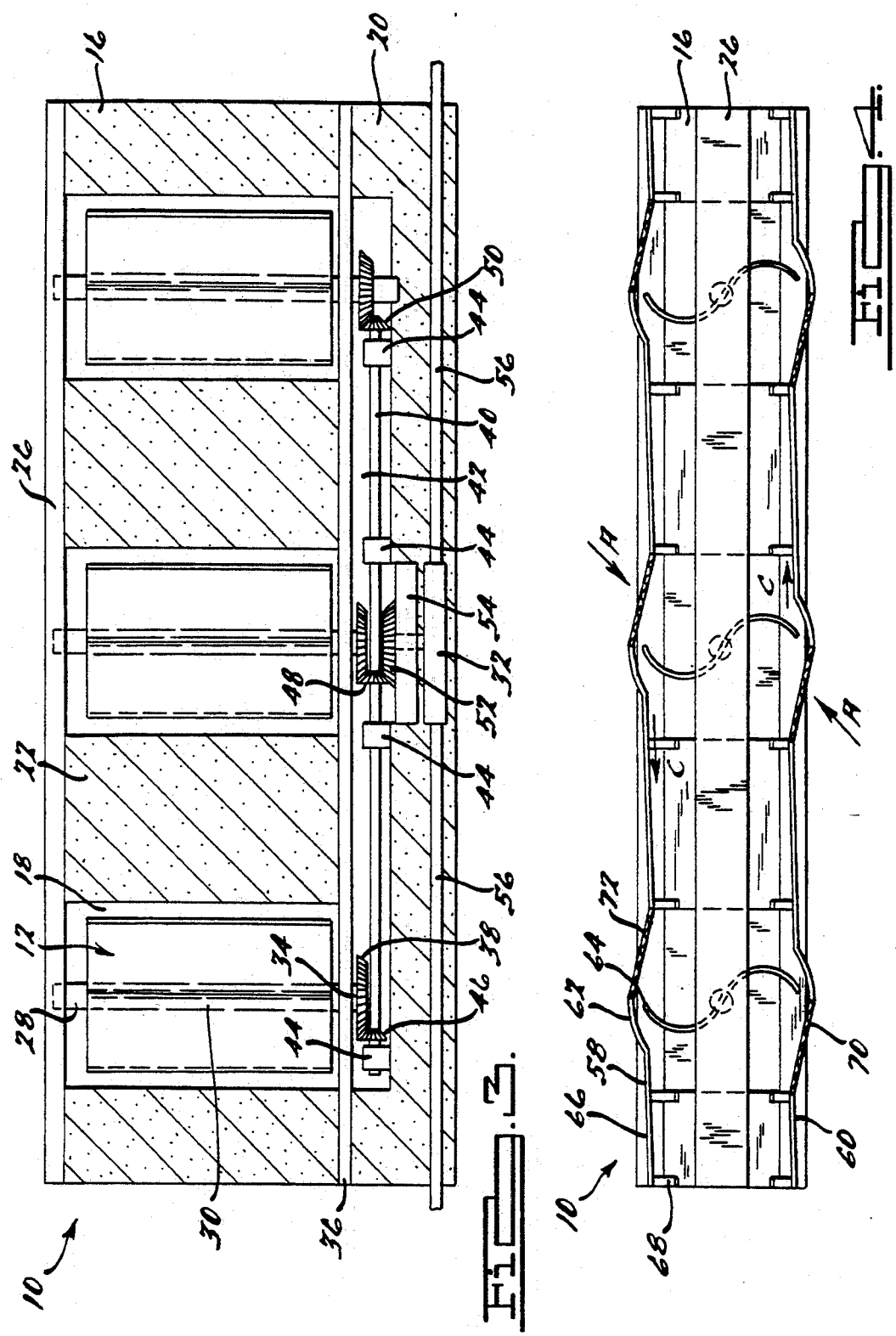

APPARATUS FOR GENERATING POWER

BACKGROUND AND SUMMARY OF THE INVENTION

The present invention relates generally to the generation of power. More particularly, the present invention relates to an apparatus for generating power from a wind current created from moving vehicles.

An important consideration in the preservation and improvement of the environment is the control and elimination of pollution associated with the byproducts of numerous techniques utilized in the production of bulk electric power. The production of bulk electric power for industrial, residential, and rural use generally implies large-scale production of electric power in stationary plants designed specifically for those purposes. Typically, the generating units in these plants convert energy from the following: water, coal, natural gas, oil, and nuclear fuels to electrical energy. While such techniques have proven to be commercially viable, all are fraught with one or more drawbacks including, but not limited to, cost of equipment, cost and availability of fuel, and the contamination of soil, water and the atmosphere from pollution.

It is also known that wind energy can be converted to electrical power. The use of wind energy dates back to sailing ships and windmills. Today the interest in wind is for electricity generation by wind turbines. Wind provides a source of fuel which is clean and has no associated costs.

Wind turbine technology has demonstrated the potential for contributing to the energy needs of the United States as well as the rest of the world. Most typically, energy from wind is harnessed by providing numerous rotors which are individually coupled to generators and mounted on towers. As wind causes the blades of the rotors to spin, each generator outputs AC current which travels through a cable down the tower into a field transformer. There the voltage is increased and sent to a substation that converts it to an even higher voltage. This power can then be distributed over utility transmission lines and converted to a usable voltage at remote pole transformers before it is ultimately received by the consumer.

While prior techniques for harnessing wind energy have generally proven somewhat effective, they also have several disadvantages. For example, prior techniques generally are not adapted to readily incorporate a substantially constant source of wind energy, relying on naturally occurring winds. Further, prior techniques have not proven successful in simultaneously harnessing two wind sources substantially opposite in direction.

Another disadvantage of prior techniques is that the geographical areas best suited are generally located significant distances from population centers. This is because wide-open areas of unused land is required for wind turbines since they need to be spaced apart significant distances to allow the strength of the wind to rebuild between units.

It is therefore a principal object of the present invention to provide an apparatus for generating power from a readily available, inexpensive source of fuel.

It is a related object of the present invention to provide an apparatus for generating power which does not produce byproducts which contribute to the contamination of soil, water or the atmosphere.

It is an additional object of the present invention to provide an apparatus for generating power which is suitable for replacing or supplementing conventional methods for generating power during times of peak demand.

It is a further object of the present invention to provide an apparatus for producing electrical energy which is adapted to operate in areas close to population centers, and thereby eliminate costs and power losses associated with the transfer of electrical energy over significant distances.

It is yet another object of the present invention to provide an apparatus for generating power which utilizes fuel in the form of wind produced by vehicular traffic in areas of substantial traffic flow.

It is yet a further object of the present invention to provide an apparatus for generating power which is adapted to be disposed between two oppositely directed lanes of traffic and which substantially structurally replaces a conventional divider.

It is still yet a further object of the present invention to provide an apparatus for generating power which is adapted to simultaneously harness two oppositely directed sources of wind.

The present invention solves the above problems as well as other problems associated with existing designs by providing:

An apparatus in accordance with preferred embodiments of the present invention is adapted for generating power by utilizing the wind produced from the passage of vehicular traffic. The apparatus generally comprises at least one vertical axis rotor coupled to an energy transducing means for converting rotational energy into a form of energy that can be transmitted to a remote location. In the preferred embodiments, the rotor comprises a well known Savonius rotor and is mounted for rotation in a support framework. The support framework also preferably houses the energy transducer means therein and cabling means coupled to the energy transducer means for transmitting the energy generated therein to a remote location, for example, an electrical power distribution facility.

In the preferred embodiments a plurality of Savonius rotors are mounted within cavities in the support framework and operate cooperatively to produce rotational energy to be converted by the energy transducer means into useful energy. The support framework is positioned preferably between adjacent and opposite lanes of any road or highway, such as a freeway or expressway, where vehicular traffic moves in opposite directions on opposite sides of the support framework.

As vehicular traffic moves on both (i.e., opposite) sides of the support framework, the wind generated from the moving vehicles impinges the rotors, cooperatively causing them to rotate. The energy transducing means converts the rotational energy into useful power which is transmitted to the remote facility.

The above and various other advantages and features of novelty which characterize the present invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals indicate corresponding parts throughout the several views.

FIG. 3 is a cross-sectional view along line 3—3 of the embodiment shown in FIG. 2; and FIG. 4 is a top view of the apparatus of FIG. 1 shown incorporating an optional deflector and screen.

DETAILED DESCRIPTION OF THE PREFERRED EMBODIMENT

As used in this application, the term "Savonius rotor" includes rotors having a shape as generally illustrated in this application, as well as rotors with two or more blades of the classic Savonius type, wherein the rotor blades are generally semi-cylindrical in shape. This is in contrast to turbines which have the inner edges of the blades fixed to adjoining blades or to a central core, drum, shaft or the like.

Federal regulations and laws dictate that barriers be positioned between two oppositely directed lanes of traffic for such arteries as interstates and highways. As will become more apparent below, the apparatus of the present invention is designed to replace a conventional barrier with a barrier adapted to harness a heretofore untapped source of fuel. In this regard, the apparatus of the present invention is designed to be structurally sufficient to replace such conventional barriers.

Figure 1:
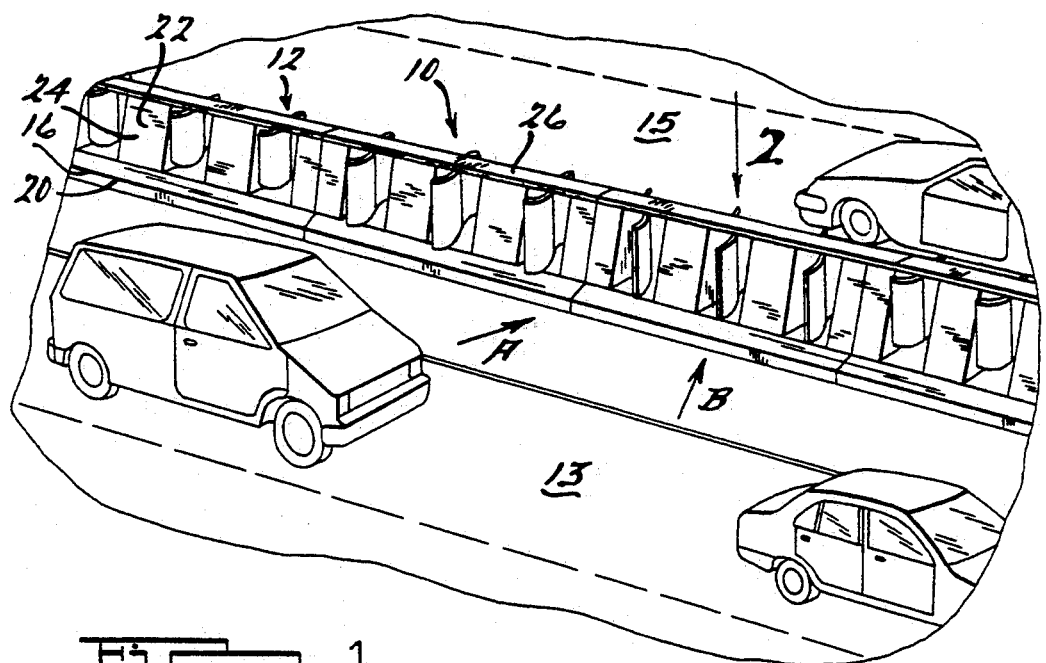
FIG. 1 is a perspective view of a preferred embodiment of the present invention shown in operative association with a vehicular roadway.

Turning to FIGS. 1-4, a preferred embodiment of the apparatus 10 for generating power of the present invention is illustrated. In FIG. 1, the apparatus 10 of the present invention is shown being utilized between two oppositely traveling lanes of vehicular traffic. It will be appreciated by those skilled in the art that the utilization as shown in FIG. 1, is merely exemplary and that the teachings of the present invention are equally suited for producing energy from any suitable source of wind, particularly wind resulting from motor vehicles, subways, trains and the like. Further in this regard, the apparatus 10 of the present invention is further suited for returning spent energy to electrical vehicles such as electrical automobiles and subways.

The apparatus 10 of the present invention generally comprises at least one vertical axis rotor 12 having at least two blades 14. In the preferred embodiment, each rotor is of the well known Savonius type. However, it will be appreciated by those skilled in the art that any suitable rotor configuration can be incorporated without departing from the scope of the present invention. Vertical axis rotors are preferred since they operate independently of wind direction and thus have a potential for high efficiency in changing winds. Additionally, the rotors 12 of the present invention are well suited to receive wind from multiple directions simultaneously. Briefly in this regard, vehicular traffic may produce a current of wind in a first direction relative to the direction of traffic flow in a first lane of traffic 13, represented in FIG. 1 by arrow A, while naturally occurring wind may produce a current of wind in a second direction as represented in FIG. 1 by arrow B. Accordingly, the rotors 12 are further suited to simultaneously receive wind produced by traffic flow in a second lane of traffic 15, in a direction substantially opposite that represented by arrow A. In sum, the rotors 12 of the present invention are adapted to simultaneously receive and harness three independent sources of wind; those produced by a first lane of traffic 13, a second lane of traffic 15, and naturally occurring wind.

It is also anticipated that, if desired, a split-type rotor could be utilized wherein the top and bottom portions of the rotor are independently rotatable. The exemplary embodiment illustrates rotors 12 having two diametrically opposed blades 14. It should further be appreciated that an even greater number of blades 14 could be easily incorporated to suit the needs of specific applications.

The apparatus 10 of the present invention further comprises support framework 16 having a first side 16a and a second side 16b, substantially in the shape of a conventional concrete highway median barrier. In the preferred embodiment, the support framework 16 is constructed of concrete in conventional fashion to include a plurality of cavities 18. In the exemplary embodiment illustrated throughout the figures, the support framework includes three such cavities 18, each cavity 18 being adapted to rotatably mount a vertical axis rotor 12. However, it will be appreciated by those skilled in the art that the support framework 16 can be modified to incorporate any particular number of rotors 12.

The support framework 16 includes a base portion 20 and unitarily formed partitioning portions 22 which serve to divide the cavities 18. The partitioning portions 22 include a front side 24 and a back side 25 which both preferably taper upwardly.

The support framework 16 further includes a metal beam member 26 which traverses substantially the entire length of the remainder of the support framework 16 at its top. As is shown in FIG. 3, the beam member 26 is adapted to rotatably receive a first end 28 of a first end 28 of the shaft 30 to which each rotor 12 is mounted. As is known in the art, a suitable bearing (not shown) can be disposed between the shaft 30 and the beam 26 to facilitate rotation. If desired, the beam can further include hooks (not shown) which allow for the apparatus 10 of the present invention to be transported and positioned by a crane, or the like.

The apparatus 10 of the present invention further comprises energy transducer means 32 mounted in the support framework 16 (as shown in FIG. 3). In the preferred embodiment, the energy transducer means 32 comprises a generator, a motor and a high-speed gear box. The energy transducer means 32 is mechanically coupled to each of the vertical axis rotors 12. The generator of the energy transducer means 32 is operative to convert rotational energy into a form of energy, e.g., electrical energy, that can be transmitted to a remote location.

A second end 34 of each shaft 30 to which the rotors 12 are mounted rotatably passes through a support beam 36 which serves to support the weight of the rotors 12. A suitable bearing (not shown) is disposed between the support beam 36 and the second end 34 of each second end 34 of each shaft 30. Each shaft 30 is further fixedly coupled at its second, or lower, end 34 to a bevel gear 38.

With further reference to FIG. 3, the apparatus 10 of the present invention further includes a horizontal shaft 40 which is disposed within a horizontal cavity 42 formed within the support framework 16. The horizontal shaft 40 is supported by conventional bearings 44, and includes first, second and third pinion gears 46, 48, 50 which are associated with the bevel gears 38. The pinion gears 46, 48, 50 take the input received from the bevel gears 38 and transfer it to a single input gear 52 which is coupled to the generator of the energy transducer means 32.

The apparatus of the present invention 10 further comprises a flywheel 54 which is coupled to the generator of the energy transducer means 32. The flywheel 54 is adapted to maintain energy output despite intermittent lapses of wind delivered to the rotors 12. The motor of the energy transducer means 32 further operates to initially power-up the flywheel 54. Electrical energy generated by the generator is transmitted through electrical cabling 56 to a remote location, such as a substation, electrical vehicle charging station or the like, or to an adjacent unit substantially similar to that depicted throughout the figures. Optionally, cabling 56 may include independent conductors which may be used to supply power to the energy transducer means 32 to cause the energy transducer means to initially import at least a small amount of rotation to the rotors 12 via shaft 40 and gears 46, 48 and 50, or to continuously rotate the rotors 12 during periods when traffic is very light, and insufficient wind is generated to power the rotors 12.

With reference to FIG. 4, in the preferred embodiment, the apparatus of the present invention may further optionally comprise first and second deflector members 58, 60 associated with each of the rotors 12. The function of the deflector members 58, 60 is twofold. First, each deflector member 58, 60 functions to concentrate the wind received from adjacent vehicular traffic toward its associated rotor 12. Second, each deflector member 58, 60 serves to route spent air which passes through the rotor 12 onto the next rotor 12 in the direction of the adjacent flow of traffic. The deflector members 58, 60 further function to prevent hostile winds which would oppose rotation of the rotors 12 from entering the cavities 18. To these ends, each deflector member 58, 60 includes a curved portion 62 disposed adjacent the circumference of a circle on which the outer edge 64 of the rotor 12 lies. The deflector member 58, 60 further includes a substantially linear portion 66 integrally connected to the curved portion 62 and slightly angled toward the support framework 16 as it extends from the curved portion 62. In the preferred embodiment, the deflector members 58, 60 are mounted to the support framework 16 by way of support arms 68. However, it should be appreciated that the deflector member 58, 60 can be mounted to the support framework 16 by any other suitable means.

In the preferred embodiment the apparatus of the present invention 10 may further optionally comprise first and second screens 70, 72 associated with each rotor 12 and which are mounted so as to enclose the rotors 12. The first and second screens 70, 72 serve to protect the rotors 12 from interference of debris such as stones and the like.

Figure 2:
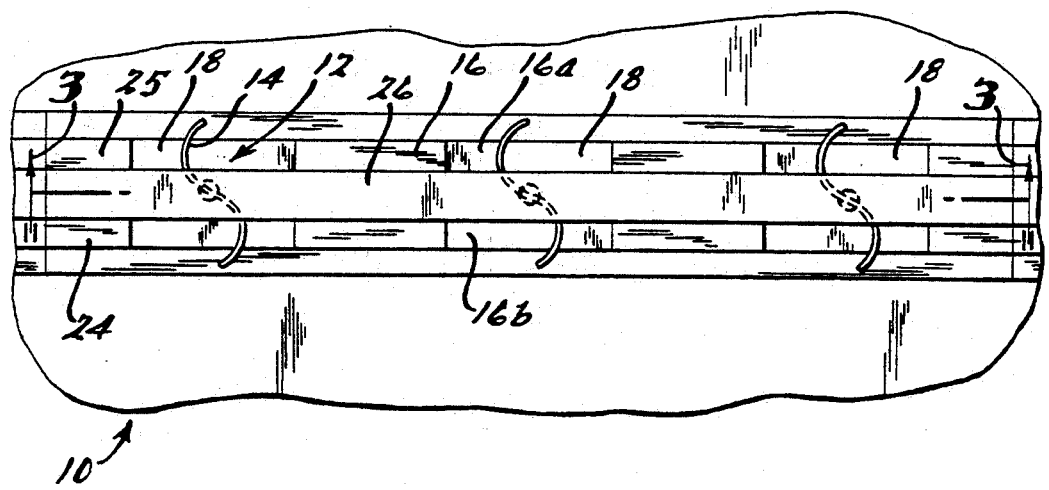
FIG. 2 is a top view of the apparatus of the present invention shown in FIG. 1.

The operation of the apparatus of the present invention will now be described with particular reference to FIGS. 1 and 2. Prior to peak times of vehicular traffic, the motor of the energy transducer means 32 functions to initially rotate the flywheel 54. As traffic begins to flow, the resultant wind from the traffic is transferred to the rotors 12. This resultant wind is represented by reference letter A in FIGS. 1 and 4. As shown in FIG. 4, each rotor 12 is adapted to receive wind produced by passing vehicles from two different sides. After the wind from the vehicles enters the cavity 18, it causes the rotor 12 to rotate counterclockwise as shown in FIG. 4. The spent air produced by the rotors 12, represented by reference letter C in FIG. 4, is directed toward the next rotor 12 in the direction of the vehicle flow. This spent air then serves to further propel the next rotor 12. Accordingly, all of the rotors 12 are driven simultaneously by the cooperative forces of the winds created by moving vehicles travelling in separate and opposite directions along highway lanes 13 and 15.

While the above detailed description describes the preferred embodiment of the present invention, it will be understood that the present invention is susceptible to modification, variation and alteration without deviating from the scope and fair meaning of the subjoined claims.

What is claimed is:

1. An apparatus for generating power by utilizing wind produced from the passage of vehicular traffic, said apparatus comprising:

at least one rotor adapted to rotate about a vertical axis extending therethrough for capturing said wind;

generator means coupled to said at least one rotor for converting rotational movement of said rotor into a form of energy that can be transmitted to a remote location; and support means for rotatably supporting said at least one vertical axis rotor, said support means having first and second openings for exposing diametrically opposed sides of each of said at least one rotor;

whereby the motion of the vehicular traffic adjacent said at least one rotor generates said wind, thereby causing said rotor to rotate which in turn causes said generator to generate said energy.

2. The apparatus of claim 1, further comprising a flywheel coupled to said generator means.

3. The apparatus of claim 1, further comprising concentrator means positioned closely adjacent said rotor for concentrating said wind produced from the passage of vehicular traffic toward said at least one rotor.

4. The apparatus of claim 1 further comprising means for directing a spent air flow produced from said at least one rotor toward a second rotor.

5. An electric power generating system of a type adapted for use in conjunction with a motor vehicle expressway upon which travel a plurality of moving vehicles, the system comprising:

a support structure including a plurality of cavities said support structure including a first side and a second side, said first and second sides each including openings to expose diametrically opposed sides of each of said rotors;

a corresponding plurality of Savonius rotors each adapted for rotational movement about a vertical axis extending vertically therethrough, each of said rotors being rotatably mounted in one of said plurality of cavities; and generator means mounted in said support structure, said generator means being operationally coupled to each of said plurality of rotors, said generator means adapted to convert rotational energy generated by said rotors in response to wind generated from said plurality of moving vehicles into electrical power that can be transmitted to a remote location.

6. The electric power generating system of claim 5, wherein said energy transducer means comprises an electrical generator.

7. The electric power generating system of claim 6, further comprising a flywheel coupled to said electrical generator.

8. The electric power generating system of claim 5, further comprising concentrator means for concentrating said wind produced from the passage of vehicular traffic toward said plurality of rotors.

9. The electric power generating system of claim 8 further comprising means for directing a spent air flow produced from a first rotor of said plurality of rotors toward a second rotor of said plurality of rotors.

10. The electric power generating system of claim 5, further comprising cabling means operatively coupled in between said generator means and said remote location for transmitting energy generated by said generator means to said remote location.

11. An apparatus for generating power by utilizing wind produced from the passage of vehicular traffic, said apparatus comprising:
at least first and second rotors each adapted to rotate about a vertical axis extending therethrough to generate rotational energy in response to said wind produced from said passage of vehicular traffic;
generator means operationally coupled to said first and second rotors, said generator means adapted to convert said rotational energy into a form of energy that can be transmitted to a remote location;
support means for rotatably supporting each of said first and second vertical axis rotors; and
deflector means for concentrating said wind received from said vehicular traffic towards one of said first and second rotors to thereby increase said rotational energy generated by said one of said first and second rotors.

12. The apparatus of claim 11, wherein the deflector means further operates to deliver a source of spent air from said first rotor to said second rotor.

13. The apparatus of claim 12 wherein the deflector means comprises a first deflector member having a curved portion disposed substantially adjacent the circumference of a circle on which an outer edge of said one of said rotors lies.

14. The apparatus of claim 13, wherein said first deflector member further includes a substantially linear portion integrally connected to said curved portion, said linear portion tapering slightly toward said support means and away from said curved portion.

15. The apparatus of claim 14, wherein said support means has first and second openings for exposing diametrically opposed sides of each of said rotors and further wherein said first deflector member is mounted substantially adjacent to said first opening.

16. The apparatus of claim 15, further comprising a second deflector member substantially identical to the first deflector member, said second deflector member being mounted substantially adjacent to said second opening.

* * * * *